(12) United States Patent
Kim et al.

(10) Patent No.: US 9,726,810 B2
(45) Date of Patent: Aug. 8, 2017

(54) LIGHTING DEVICE AND FLAT PANEL DISPLAY HAVING THE LIGHTING DEVICE

(71) Applicant: LG INNOTEK CO., LTD., Seoul (KR)

(72) Inventors: Min Jae Kim, Seoul (KR); Bi Yi Kim, Seoul (KR); Se Woong Na, Seoul (KR); Hyun Gyu Park, Seoul (KR); In Hee Cho, Seoul (KR); Man Hue Choi, Seoul (KR); Seung Kwon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 176 days.

(21) Appl. No.: 14/291,559

(22) Filed: May 30, 2014

(65) Prior Publication Data

US 2015/0009710 A1 Jan. 8, 2015

(30) Foreign Application Priority Data

Jul. 2, 2013 (KR) ........................ 10-2013-0077311

(51) Int. Cl.
*F21V 8/00* (2006.01)

(52) U.S. Cl.
CPC ......... *G02B 6/0073* (2013.01); *G02B 6/0021* (2013.01); *G02B 6/0068* (2013.01); *G02B 6/0091* (2013.01)

(58) Field of Classification Search
CPC .. G02B 6/0091; G02B 6/0073; G02B 6/0068; G02B 6/0021
See application file for complete search history.

(56) References Cited

U.S. PATENT DOCUMENTS

| | | | | |
|---|---|---|---|---|
| 7,360,940 B2* | 4/2008 | Chang | ......... | G02B 6/0091 349/58 |
| 7,969,525 B2* | 6/2011 | Watanabe | ......... | G02B 6/0021 349/58 |
| 8,517,591 B2* | 8/2013 | Nakamoto | ......... | G02B 6/0046 362/617 |
| 8,770,822 B2* | 7/2014 | Que | ......... | G02B 6/0085 349/58 |
| 8,860,042 B2* | 10/2014 | Zhou | ......... | G02B 6/0073 257/432 |

(Continued)

FOREIGN PATENT DOCUMENTS

| | | | | |
|---|---|---|---|---|
| CN | 101943352 | * | 1/2011 | ............ F21S 8/00 |
| CN | 202176976 U | | 3/2012 | |

(Continued)

OTHER PUBLICATIONS

Office Action dated Oct. 24, 2016 in Chinese Application No. 201410313043.5.

*Primary Examiner* — Peggy Neils
(74) *Attorney, Agent, or Firm* — Saliwanchik, Lloyd & Eisenschenk

(57) ABSTRACT

Provided are a lighting device and a flat panel display having the lighting device, the lighting device, including: a support substrate; a circuit board on the support substrate; light emitting devices mounted on the circuit board; and a light guide plate having a protruding portion protruding to a remaining region except for a region in which the light emitting devices are disposed.

3 Claims, 10 Drawing Sheets

(56) References Cited

U.S. PATENT DOCUMENTS

| | | | |
|---|---|---|---|
| 2007/0008739 A1* | 1/2007 | Kim | G02B 6/0021 362/612 |
| 2008/0002428 A1 | 1/2008 | Byun et al. | |
| 2008/0297687 A1 | 12/2008 | Watanabe | |
| 2008/0304288 A1* | 12/2008 | Iwasaki | F21V 29/02 362/632 |
| 2009/0073347 A1* | 3/2009 | Takahashi | G02B 6/002 349/65 |
| 2009/0296423 A1* | 12/2009 | Kim | G02B 6/0021 362/623 |
| 2010/0290248 A1* | 11/2010 | Park | G02B 6/0091 362/606 |
| 2012/0287371 A1* | 11/2012 | Oura | G02F 1/133615 349/60 |
| 2013/0051069 A1 | 2/2013 | Moon et al. | |
| 2013/0107567 A1* | 5/2013 | Lin | G02F 1/133615 362/602 |
| 2015/0029443 A1* | 1/2015 | Inui | G02F 1/133308 349/65 |

FOREIGN PATENT DOCUMENTS

| | | |
|---|---|---|
| JP | 2008053069 A | 3/2008 |
| WO | WO-2012/091507 A2 | 7/2012 |

* cited by examiner

LIGHTING DEVICE AND FLAT PANEL DISPLAY HAVING THE LIGHTING DEVICE

CROSS-REFERENCE TO RELATED APPLICATION

This application claims the benefit under 35 U.S.C §119 of Korean Patent Application No. 10-2013-0077311, filed Jul. 2, 2013, which are hereby incorporated by reference in their entirety.

BACKGROUND OF THE INVENTION

Field of the Invention

Embodiments of the present invention relate to a way for efficiently fixing a circuit board and a light guide plate.

Description of the Related Arts

FIG. 1 is a view illustrating a lighting device according to a conventional art.

Referring to FIG. 1, the lighting device includes: a circuit board 100 in which a plurality of light emitting devices 120, such as light emitting diodes (LEDs) is mounted on a support substrate 110; a light guide plate 200 disposed in a direction of a light emitting surface of the light emitting devices 120; and an outer housing 300 supporting the light guide plate 200 and the circuit board 100 together.

Since the light guide plate 200 and the circuit board 100 (Printed Circuit Board) are not completely attached to each other, the light guide plate may be movable by an external impact. Accordingly, the light emitting devices 120 mounted to the circuit board are frequently damaged by the movement of the light guide plate 200. Alternatively, when the lighting device is operated, the light guide plate 200 expands due to heat generated from the light emitting devices 120, and thus, the light emitting devices are frequently damaged.

Accordingly, ways to protect the light emitting devices in the circuit board from the light guide plate have been practically needed.

BRIEF SUMMARY

An aspect of embodiments of the present invention may provide a lighting device in which one surface of a light guide plate toward a circuit board is formed to protrude so that the light emitting devices mounted to the circuit board can be protected by the protruding one surface without direct damage to the circuit board.

Another aspect of embodiments of the present invention may provide a lighting device which is configured such that a part of a light guide plate corresponding to a region in which light emitting device is not mounted is formed to protrude more than a thickness of the light emitting device, and a surface corresponding to the light emitting device is concavely formed so that costs can be reduced because a separate separation member is not used.

A further aspect of embodiments of the present invention may provide a lighting device which is configured such that widths of each face of a light guide plate are formed to be different from each other, the light guide plate is formed in a figure whose faces are connected to each other, or a protruding portion of the light guide plate toward a light emitting surface of a light emitting device is formed in a stepped structure or a slope structure so that the light guide plate can be formed in various shapes.

Yet another aspect of embodiments of the present invention may provide a lighting device which is configured such that a light guide plate is attached to a circuit board via an adhesive material laminated on one surface, or the light guide plate is formed so that a binding portion is inserted into the circuit board via a binding hole included in the circuit board so that light emitting devices can be protected by further stably attaching the light guide plate to the circuit board.

Still another aspect of embodiments of the present invention may provide a lighting device which is configured such that in a circuit board having a first region and a second region extending to be bent from the first region, a light guide plate may be formed so that one surface of the light guide plate toward the circuit board of any one region of the first region and the second region protrudes.

Still further aspect of embodiments of the present invention may provide a flat panel display which enables light emitting devices mounted to circuit board to be protected by one surface of a light guide plate which protrudes without direct damage to the circuit board.

According to an aspect of the embodiments of the present invention, a lighting device may include: a circuit board; light emitting devices mounted to the circuit board; and a light guide plate having a protruding portion protruding to a remaining region except for a region in which the light emitting devices are disposed.

The protruding portion may protrude to a space between the light emitting devices.

The protruding portion may be formed larger than a protruding thickness of the light emitting devices.

The protruding portion may be formed to surround the light emitting devices, but not to come into contact with the light emitting devices.

The protruding portion may come into contact with a surface on which the light emitting devices are mounted.

The protruding portion may be formed not to come into contact with a surface on which the light emitting devices are mounted.

A surface of the protruding portion toward the circuit board or the light emitting devices may be formed in a stepped structure or a slope structure.

The surface of the protruding portion toward the circuit board or the light emitting devices may have any one shape of a straight lined shape, a curved shape, a circular shape, an elliptical shape and a polygonal shape.

The protruding portion may further include a projection formed on the surface toward the circuit board or the light emitting device.

The light guide plate may further include a binding portion attached to the support substrate and the circuit board.

The lighting device may further include an adhesive material layer formed on a surface of the binding portion.

The lighting device may further include a coupling hole which is formed in the circuit board, and to which the binding portion is coupled.

The circuit board may further include a support substrate.

The support substrate may include: a first region in which the light emitting devices are disposed; a second region extending from the first region; and a bending portion formed between the first region and the second region.

According to another aspect of the embodiments of the present invention, a flat panel display may include: a circuit board; light emitting devices mounted on the circuit board; a light guide plate including a protruding portion protruding to a remaining region except for a region in which the light emitting devices are disposed; and an optical film formed on one surface of the light guide plate.

The protruding portion may protrude to a space between the light emitting devices.

The protruding portion may be formed larger than a protruding thickness of the light emitting devices.

The protruding portion may be formed to surround the light emitting devices, but not to come into contact with the light emitting devices.

A surface of the protruding portion toward the circuit board or the light emitting devices may be formed in a stepped structure or a slope structure.

The surface of the protruding portion toward the circuit board or the light emitting devices may have any one shape of a straight lined shape, a curved shape, a circular shape, an elliptical shape and a polygonal shape.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
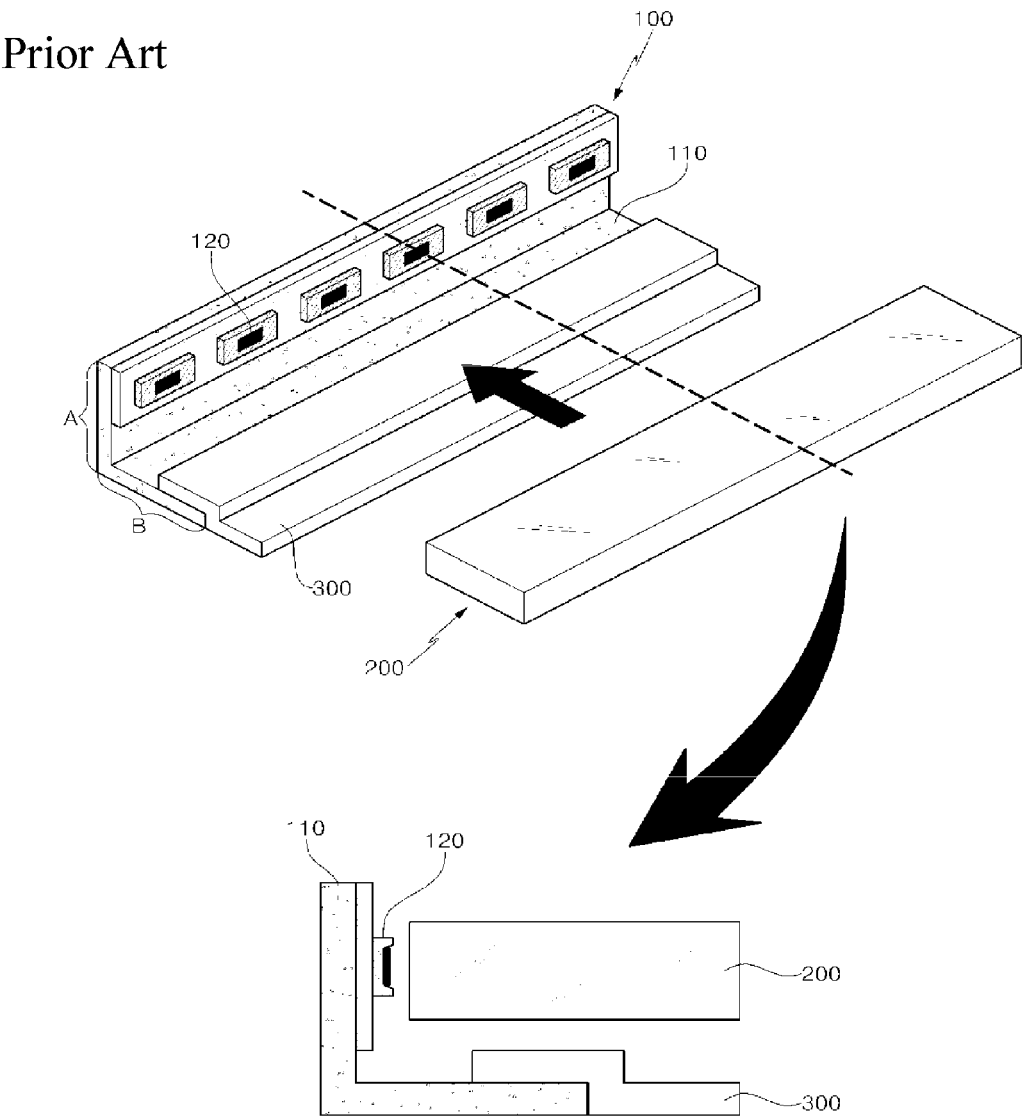
FIG. 1 is a view illustrating a lighting device according to a conventional art.

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

Figure 2:
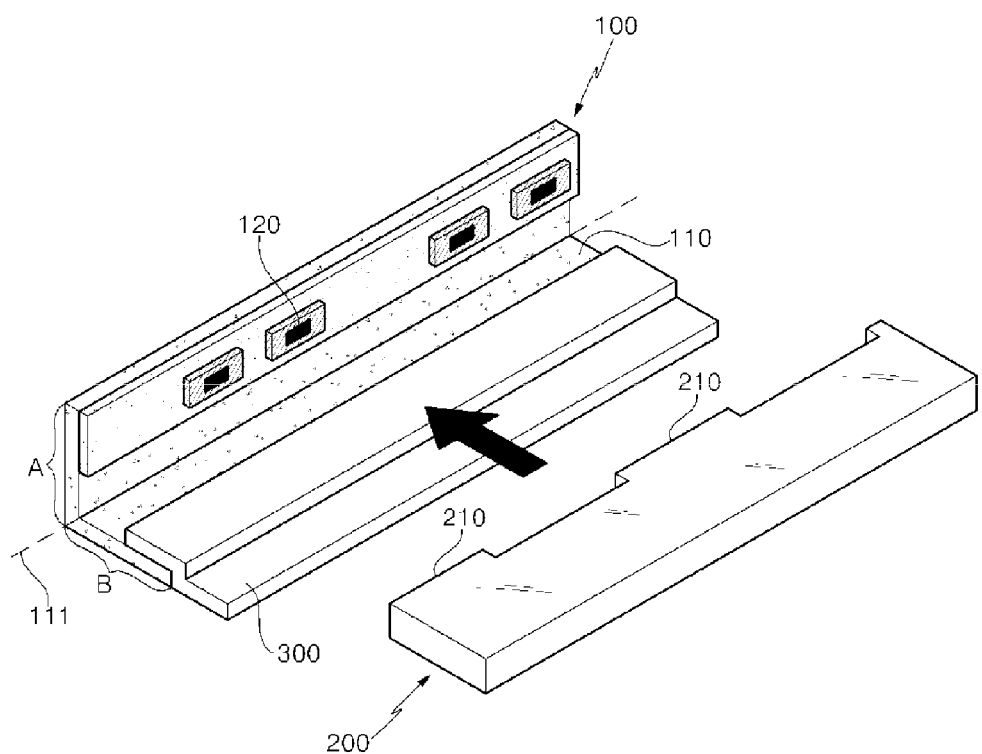
FIG. 2 illustrates an exploded perspective view of a lighting device according to an embodiment of the present invention.

FIG. 2 illustrates an exploded perspective view of a lighting device according to an embodiment of the present invention.

Referring to FIG. 2, a lighting device includes: a circuit board 100; a light emitting device 120; and a light guide plate 200.

The light emitting devices 120 are mounted on the circuit board 100.

The light guide plate 200 includes a protruding portion 210, wherein the protruding portion 210 protrudes toward the circuit board 100.

At this time, the protruding portion 210 protrudes to a remaining region except for a region in which the light emitting devices are disposed. In a conventional art, the circuit board 100 and the light guide plate could be spaced apart from each other by an outer housing 300 supporting the circuit board 100 and the light guide plate 200.

However, in the present embodiment of the invention, the circuit board 100 and the light guide plate 200 may be spaced apart from each other by providing the protruding portion 210 on one surface of the light guide plate 200 toward the circuit board 100 without forming a separate spacing member or without using the outer housing 300.

To do so, the protruding portion 210 may be formed on one surface of the light guide plate 200 corresponding to a light emitting surface of the light emitting devices 120. For example, the protruding portion 210 may protrude to correspond to a region between two light emitting devices.

According to some embodiments, the circuit board 100 may include a support substrate 110, wherein the support substrate 110 may include a first region A and a second region B extending to be bent from the first region A. That is, a bending portion 111 may be formed between the first region A and the second region B.

The light guide plate 200 may include a protruding portion 210 whose one surface toward the circuit board of any one region of the first regions A and the second region protrudes.

Also, according to the position of pads or wirings connected to the light emitting devices 120, a position of the protruding portion 210 may be changed.

Figure 3:
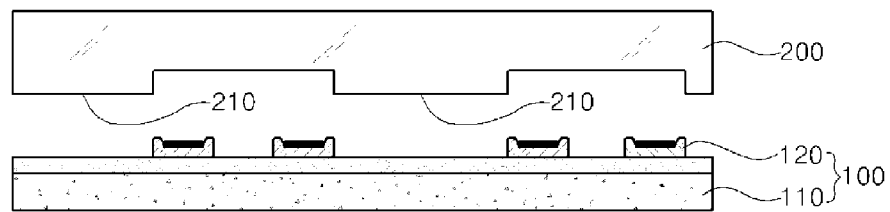
FIG. 3 illustrates a top view of the lighting device according to the embodiment of the present invention.

FIG. 3 illustrates a top view of the lighting device according to the embodiment of the present invention.

Referring to FIG. 3, the light emitting devices 120 is mounted to the circuit board 100, wherein the circuit board may include the support substrate 110.

The light guide plate 200 may be configured such that one part corresponding to a region (a remaining region except for a region in which the light emitting device is mounted) in which the light emitting device 120 is not mounted includes the protruding portion 210 which protrudes greater than a thickness of the light emitting device 120. For example, the light guide plate 200 may be configured such that one part of the light guide plate corresponding to a region between two light emitting devices is formed to protrude, and another part of the light guide plate corresponding to a region in which the light emitting device 120 is mounted is formed to be concave, so that the light guide plate 200 can be formed to be embossed.

Also, the protruding portion 210 may be formed greater than the protruding thickness of the light emitting device 120, and the protruding portion 210 may be formed to surrounds the light emitting device 120, but not to come into contact with the light emitting device.

Figure 4:
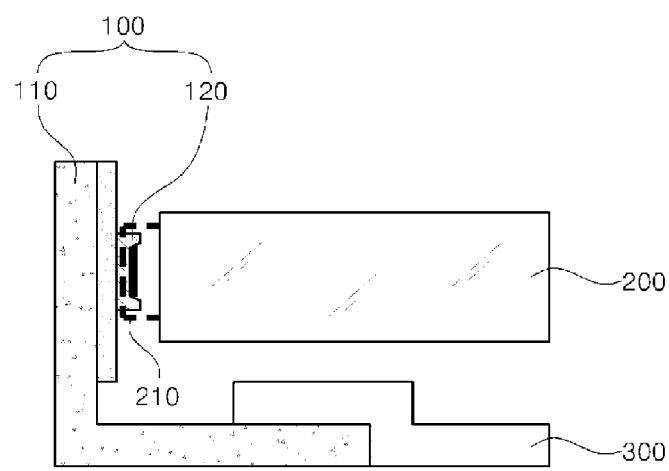
FIG. 4 illustrates a side view of the lighting device according to the embodiment of the present invention.

FIG. 4 illustrates a side view of the lighting device according to the embodiment of the present invention.

Referring to FIG. 4, the light guide plate 200 is spaced apart from the circuit board 100 due to the protruding portion 210 whose one surface corresponding to the light emitting surface of the light emitting device 120 protrudes.

That is, the protruding portion 210 enables the light emitting device 120 to be prevented from being damaged by separating the circuit board 100 from the light guide plate 200 when the light guide plate 200 is moved by external impact or when the light guide plate 200 expands due to heat generated from the light emitting device 120.

FIGS. 5 to 10 are views illustrating various examples of the light guide plate in the lighting device.

Figure 5:
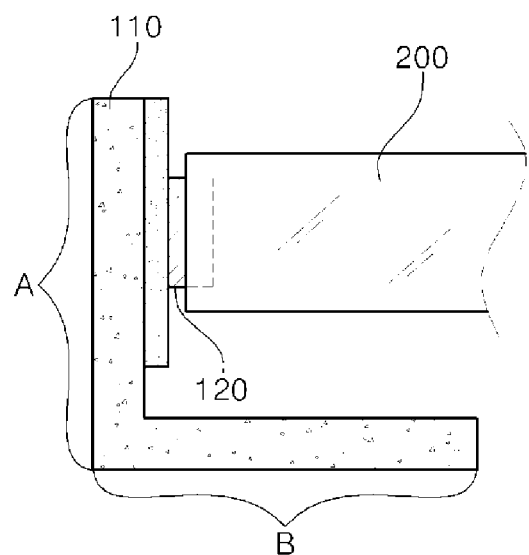
FIGS. 5 to 10 are views illustrating various examples of the light guide plate in the lighting device.

Referring to FIG. 5, one surface of the light guide plate 200 corresponding to the light emitting surface of the light emitting device 120 may be formed not to come into contact with the region in which the light emitting device 120 is not mounted. In a case where the one surface does not come into contact with a spaced portion, the light guide plate 200 may expand into a space between the circuit board 100 and the light guide plate 200 even though the light guide plate expands due to heat generated from the light emitting device 120, thereby enabling the light emitting device 120 to be prevented from being damaged.

Figure 6:
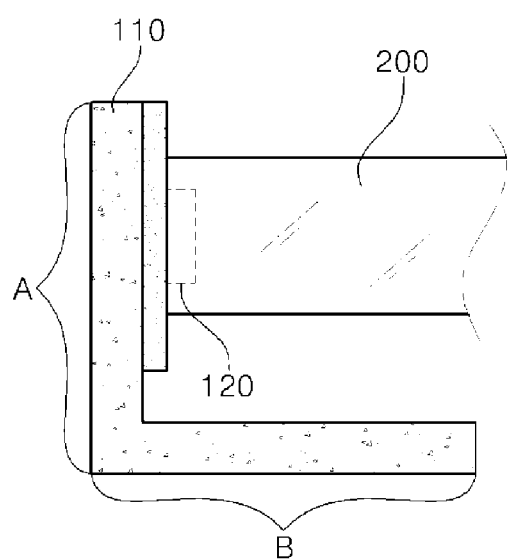

Also, as shown in an embodiment of FIG. 6, one surface of the light guide plate 200 may be formed to come into contact with the region in which the light emitting device is not mounted. In this case, no space between the circuit board 100 and the light guide plate 200 exists so that the light guide plate 200 can be easily attached to the circuit board 100.

Figure 7:
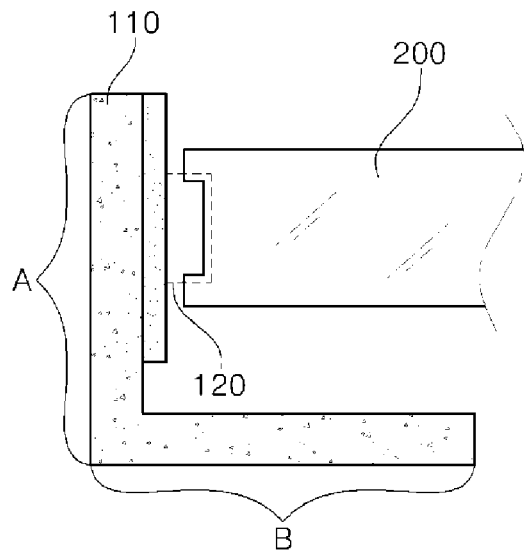

Also, as shown in another embodiment of FIG. 7, one surface of the light guide plate 200 corresponding to the light emitting surface of the light emitting device 120 may be formed in a stepped structure. In this case, even though a part (upper and lower sides) of the one surface corresponding to the light emitting surface of the light emitting device 120 expands due to heat of the light emitting device 120 and thus comes into contact with the spaced portion between the light emitting device 120 and the adjacent light emitting device, a remaining part (middle surface) of the one surface corresponding to the light emitting surface of the light emitting device 120 becomes nearer to the light emitting device without contact such that a distance therebetween is only reduced, thereby enabling the light emitting device 120 to be prevented from being damaged.

Figure 8:
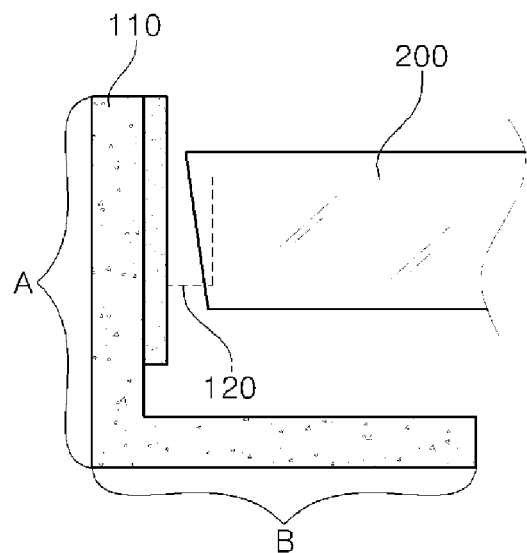

Also, as shown in a further embodiment of FIG. 8, one surface of the light guide plate 200 corresponding to the light emitting surface of the light emitting device 120 may be formed in a slope structure. In this case, even though a part (upper part) of the one surface corresponding to the light emitting surface of the light emitting device 120 expands due to heat of the light emitting device 120 and thus comes into contact with a region in which the light emitting device 120 is not mounted, a remaining part (lower part) of the one surface corresponding to the light emitting surface of the light emitting device 120 becomes nearer to the light emitting device 120 without contact such that a distance therebetween is only reduced, thereby enabling the light emitting device 120 to be prevented from being damaged.

Figure 9:
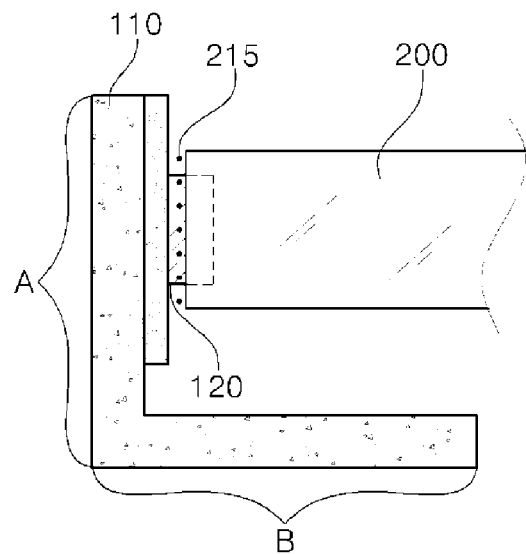

Also, as shown in the embodiment of FIG. 9, projections 215 may be formed on one surface corresponding to the light guide plate 200 corresponding to the light emitting surface of the light emitting device 120. The projections 215 are made of at least one of a resin material, a non-conductive material, and a material having lower conductivity than that of the support substrate so that damage to the circuit board 100 can be minimized even when the light guide plate 200 expands and thus comes into contact with the circuit board 100

Figure 10:
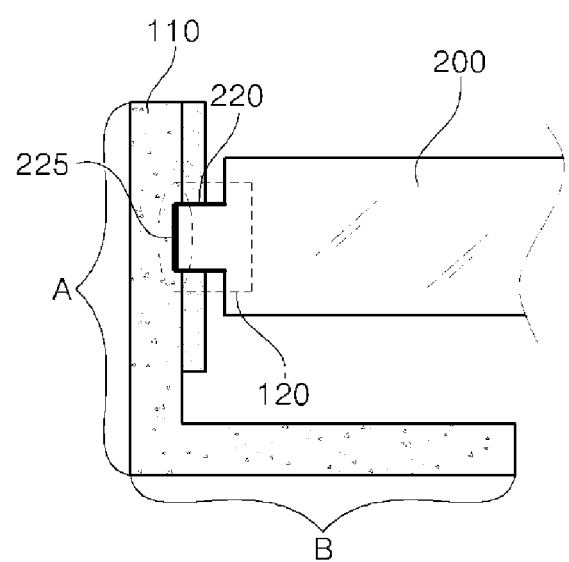

Also, as shown in yet another embodiment of FIG. 10, one surface of the light guide plate 200 corresponding to the light emitting surface of the light emitting device 120 may form a binding portion 220 attached to the circuit board 100. For example, an adhesive material layer may be laminated on one surface of the binding portion 220, and thus the binding portion 220 may be attached to the circuit board 100 via the adhesive material layer. Alternatively, the binding portion 220 may be inserted into the circuit board 100 via a binding hole 225 included in the circuit board 100. Accordingly, the light guide plate 200 may be more stably attached to the support substrate 110 due to the binding portion 210.

Figure 11:
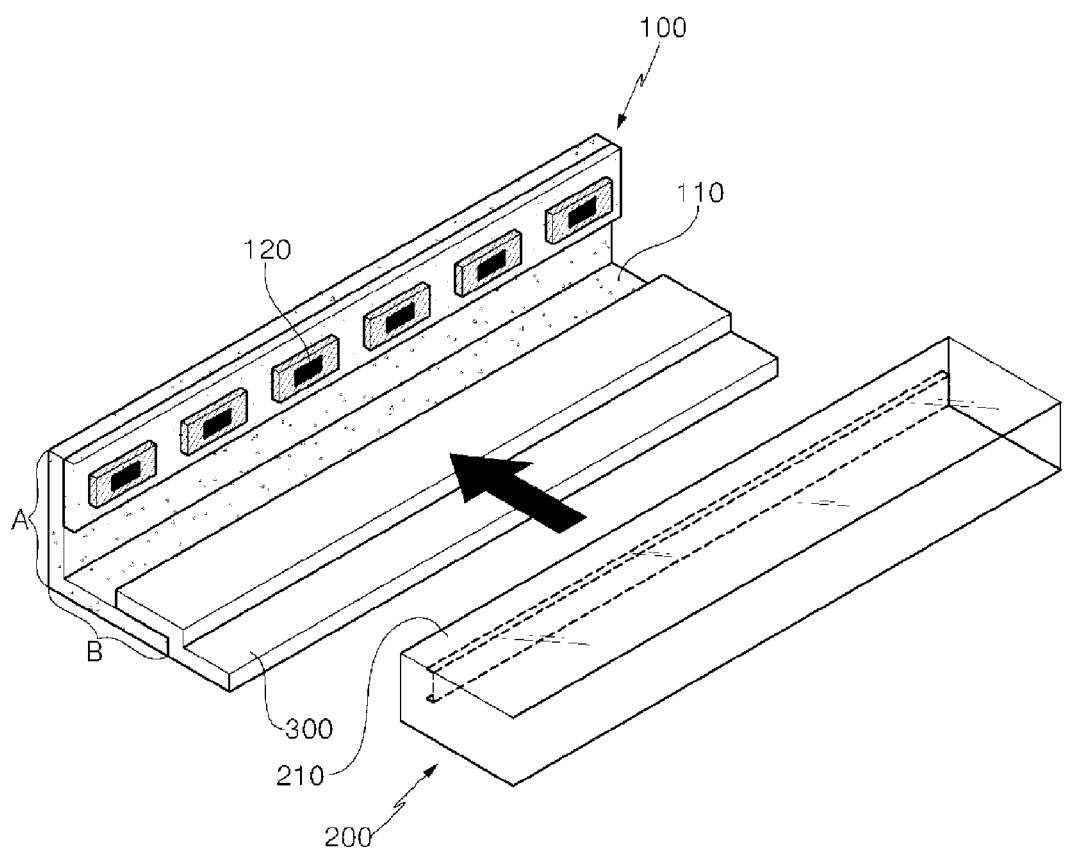
FIG. 11 illustrates an exploded perspective view of a lighting device according to other embodiment of the present invention.

FIG. 11 illustrates an exploded perspective view of a lighting device according to other embodiment of the present invention.

Referring to FIG. 11, the lighting device includes: the circuit board 100 which is configured such that the light emitting device 120 is mounted on the support substrate 110; and the light guide plate 200 having the protruding portion 210 whose one surface corresponding to a region in which the light emitting device 120 is not mounted protrudes more than a thickness of the light emitting device 120.

At this time, the protruding portion 210 may be formed such that at least two surfaces of the protruding portion corresponding to an upper side and a lower side of the light emitting device 120 protrude more than the thickness of the light emitting device.

Figure 12:
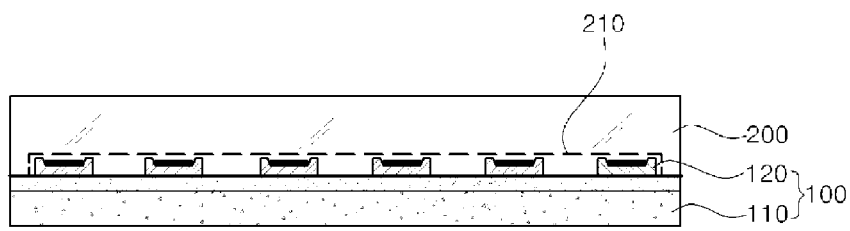
FIG. 12 illustrates a top view of the lighting device according to the other embodiment of the present invention.

FIG. 12 illustrates a top view of the lighting device according to the other embodiment of the present invention.

Referring to FIG. 12, the light guide plate 200 may be formed such that two surfaces of the light guide plate corresponding to the upper and lower sides of the light emitting devices 120 protrudes more than the protruding thickness of the light emitting device 120. Accordingly, the two surface of the light guide plate 200 corresponding to the upper and lower sides of the light emitting device 120 may be formed to protrude, and a surface of the light guide plate corresponding to the region in which the light guide plate 120 is mounted may be formed to be concave, and as a result, the light guide plate 200 may be formed to be embossed.

Figure 13:
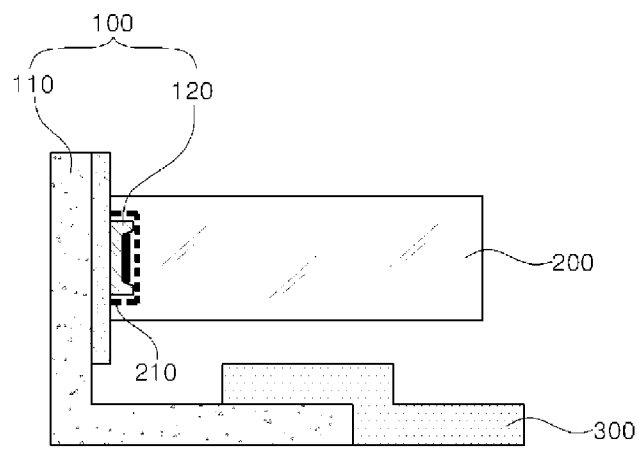
FIG. 13 illustrates a side view of the lighting device according to the other embodiment of the present invention.

FIG. 13 illustrates a side view of the lighting device according to the other embodiment of the present invention.

Referring to FIG. 13, thanks to the protruding portion 210 of the light guide plate 200 corresponding to the upper and lower sides of the light emitting device 120, even when the light guide plate 200 is moved due to external impact, or the light guide plate 200 expands due to heat generated from the light emitting device 120, the light emitting device 120 can be prevented from being damage because the two surfaces are fully attached to the circuit board 100.

FIGS. 14 to 17 are views illustrating various examples of a light guide plate in the lighting device according to the other embodiment of the present invention.

Figure 14:
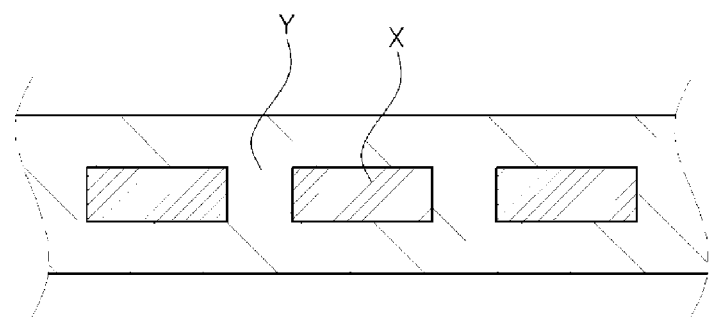
FIGS. 14 to 17 are views illustrating various examples of a light guide plate in the lighting device according to the other embodiment of the present invention.

Referring to FIG. 14, the circuit board 100 may be divided into a mounting region X in which the light emitting device 120 is mounted and a remaining region Y except for the mounting region X.

Figure 15:
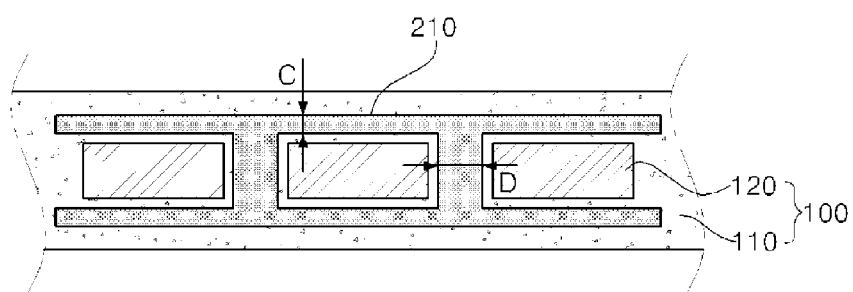
Figure 16:
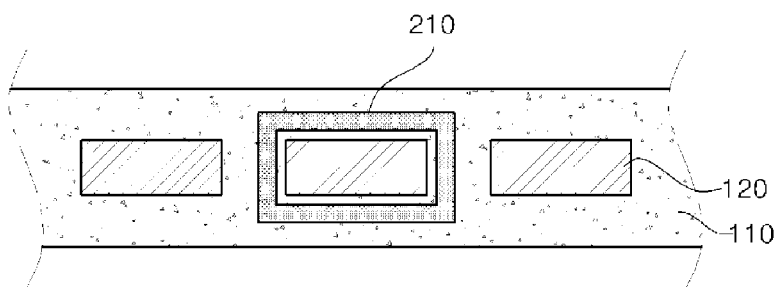
Figure 17:
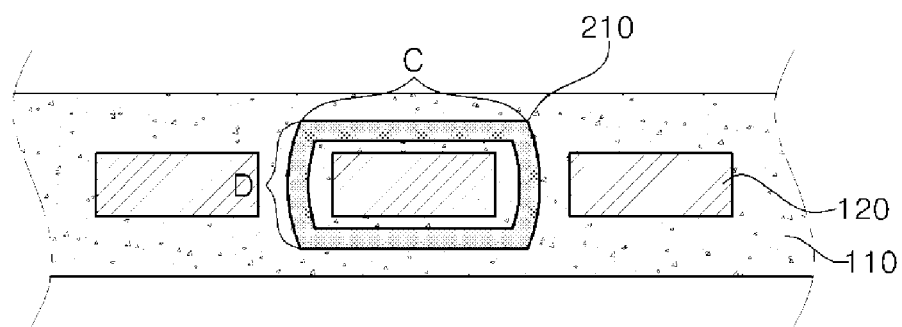

FIG. 14 illustrates appearance of the circuit board 100 as viewed from the light guide plate 200, and FIGS. 15 to 17 illustrate a surface in which the protruding portion 210 of the light guide plate 200 comes into contact with the support substrate 110.

The protruding portion 210 of the light guide plate in an embodiment of FIG. 15 is formed to surround the plurality of the light emitting devices 120 and a width D which comes into contact with a space between the light emitting devices 120 and a remaining width D are formed to be different from each other.

In another embodiment of FIG. 16, a surface in which the protruding portion 210 of the light guide plate comes into contact with the support substrate 110 is formed in a quadrangular shape.

Also, in a further embodiment of FIG. 17, a surface in which the protruding portion 210 of the light guide plate comes into contact with the support substrate 110 is formed to include a straight lined part C and a curved part D.

In yet another embodiment of the present invention, a surface in which the protruding portion 210 of the light guide plate comes into contact with the support substrate 110 may be in a circular shape, an elliptical shape, or a polygonal shape.

As set forth above, according to some embodiments of the present invention, since the light guide plate is configured such that one surface of the light guide plate toward the circuit board protrudes, the light emitting devices mounted on the circuit board can be protected by the protruding one surface without direct damage to the circuit board.

According to some embodiments of the present invention, a part of the light guide plate corresponding to the region in which the light emitting device is not mounted is formed to protrude more than a thickness of the light emitting device, and another surface corresponding to the light emitting device is formed to be concave so that costs can be reduced because a separate spacing member is not used.

According to some embodiments of the present invention, the surfaces of the light guide plate are formed to be different from each other in width or in a figure in which the surfaces of the light guide plate are connected to each other, or a protruding part toward the light emitting surface of the light emitting device is formed in a stepped structure or a slope structure, thereby enabling the light guide plate to be formed in various shapes.

According to some embodiments of the present invention, the light guide plate is attached via the adhesive material layer laminated on one surface, or the light guide plate is formed so that the binding portion is inserted into the circuit board via the binding hole included in the circuit board so that the light guide plate can be more stably attached to the circuit board, thereby enabling the light emitting device to be protected.

According to some embodiments of the present invention, the light guide plate can be formed such that, in the circuit board having the first region and the second region extending to be bent from the first region, one surface of the light guide plate toward the circuit board of the first region or the second region protrudes.

According to some embodiments of the present invention, thanks to one surface of the light guide plate which protrudes, a flat display capable of protecting the light emitting devices mounted on the circuit board without direct damage to the circuit board can be provided.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A lighting device, comprising:
a circuit board;
light emitting devices mounted on the circuit board; and
a light guide plate having a binding portion attached to the circuit board,
wherein the circuit board comprises a support substrate,
wherein the support substrate comprises: a first region in which the light emitting devices are disposed; a second region extending from the first region; and a bending portion formed between the first region and the second region,
wherein the light guide plate further comprises an adhesive material layer formed on a surface of the binding portion,
wherein the circuit board includes a binding hole into which the binding portion is inserted, the light guide plate being more stably attached to the support substrate of the circuit board due to the binding portion, and
wherein a surface of the binding portion facing the circuit board or the light emitting devices is formed in a stepped structure or a sloped structure, and the surface of the binding portion facing the circuit board or the light emitting devices has any one shape of a straight lined shape, a curved shape, a circular shape, an elliptical shape, and a polygonal shape.

2. The lighting device of claim 1, wherein the binding portion is formed larger than a protruding thickness of the light emitting devices.

3. The lighting device of claim 1, wherein the binding portion comes into contact with a surface on which the light emitting devices are mounted.

* * * * *